Nov. 13, 1962 E. J. RYAN 3,063,904
POLYMERIC OXYGEN IN BLOOD AND SERA TREATMENT
AND THE PRODUCT THEREOF
Filed Sept. 17, 1958
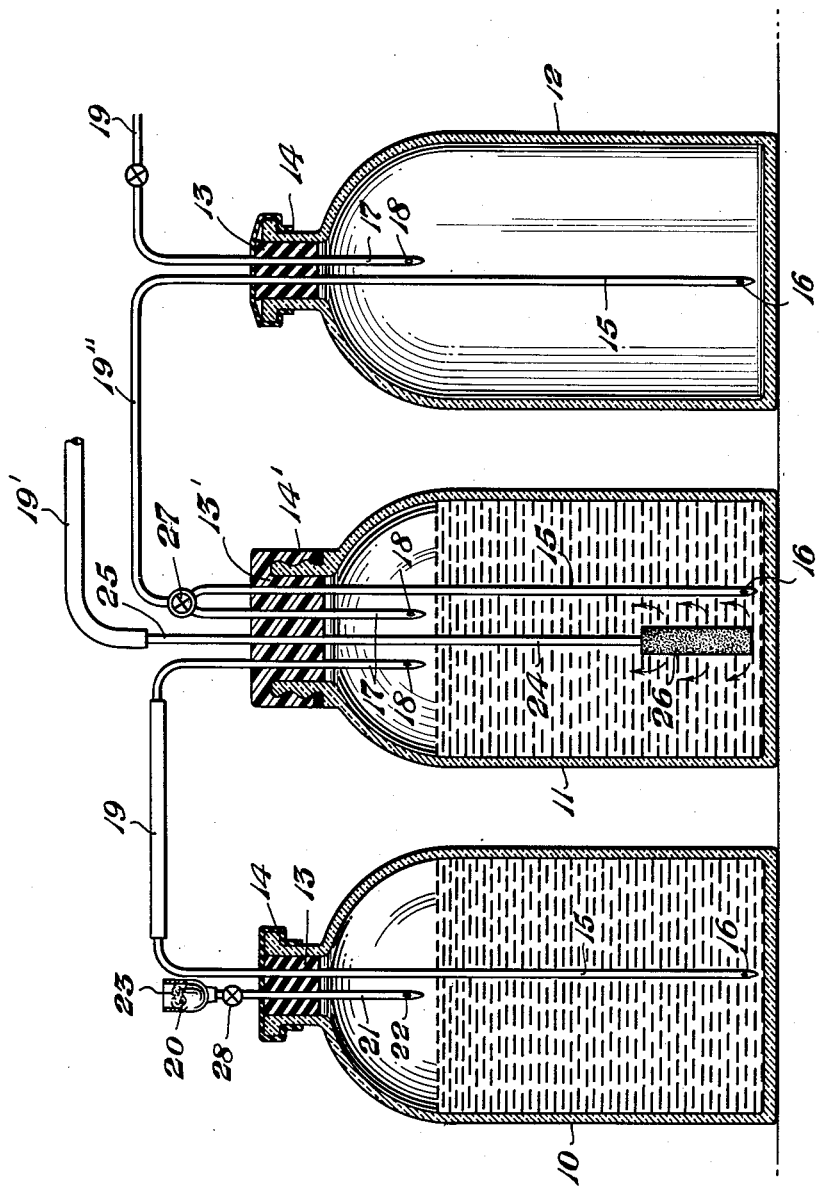
INVENTOR.
Edmund J. Ryan
BY
ATTORNEY 3,063,904
POLYMERIC OXYGEN IN BLOOD AND SERA TREATMENT AND THE PRODUCT THEREOF
Edmund J. Ryan, Miami, Fla., assignor to Poly-Gas Research and Development Co., Inc., Miami, Fla., a corporation of Florida
Filed Sept. 17, 1958, Ser. No. 762,199
10 Claims. (Cl. 167—78)

This invention is a continuation-in-part of my copending application Serial No. 554,584, filed December 21, 1955, in turn a continuation-in-part of Serial No. 173,832, filed July 14, 1950, both now abandoned, and relates to treatment of living bodies, including both animals and humans by direct injection parenterally, including intravenously of polymeric oxygen into the living body, and particularly treatment of blood and serums normally used for injection into the human body as in blood transfusions, vaccination, innoculation etc. and to polymeric oxygen aerated products such as whole blood, citrated blood, products in improved sterile, activated and stabilized form.

Blood in various forms such as citrated whole blood, blood serum or blood plasma when stored either in non-sterile conditions, or stored over excessive periods of time or which may have been contaminated in the handling or processing thereof, generically referred to herein as contaminated blood, is known to produce adverse effects upon patients into whom said blood is transfused. A blood having such adverse effects upon the patient in transfusion is commonly considered to have "pyrogens." The exact chemical nature of such pyrogens is not well understood in the art but may result from coagulation of certain factors in the blood either through excessive periods of storage, improper storage or bacterial contamination either originally present in the blood as it is obtained from a particular donor or by septic contamination in the handling and storage thereof of a chemical or bacterial nature.

The present method is particularly effective for conditioning of various vaccines, antigens, serums, antibodies and certain vitamins commonly synthesized by bacteria, which are commonly injected in the human body as curatives for specific diseases. Such products are generally formed as a component, either within or without the body or a bacteria culture, and it normally becomes necessary in the preparation thereof to first destroy the living bacteria. Treatment thereof with the active gas described herein having high bactericidal properties is one of the important features of this invention.

The living body can also be treated by injection of the gas parenterally, usually intravenously, but sometimes rectally, and often the gas is used in combination both to aerate blood, etc. as well as to inject the gas directly. According to the present invention, blood and various commercial forms thereof such as whole blood, citrated blood, blood serum, blood plasma or dried blood plasma, as well as vaccines, serums, antigens or antibodies may be improved to destroy bacterial and chemical contamination, to render the same stable in storage and more acceptable to a patient in transfusion without certain adverse effects of pyrogen blood, or otherwise contaminated innoculants by aerating such products in these various forms with an activated polymeric oxygen gas.

The treatment according to the present invention comprises aerating the blood, serum, vaccine, etc., with the therapeutically active gas hereof by bubbling the gas therethrough or otherwise homogeneously contacting the same with an activated polymeric oxygen gas hereof under therapeutic conditions.

Venus blood ordinarily having the typical bluish tinge thereof after aerating for a short period of time by contact with the activated gas hereof is converted to a typical bright red color suggestive of arterial blood and remains the same throughout any subsequent storage period. Secondly, the blood aerated in this manner has increased carbon dioxide combining power, again suggesting that the blood during aeration absorbs a certain amount of the oxygen directly as applied in its polymeric form or in some form modified in the treatment thereof.

The aerating gas hereof is an activated oxygen gas preferably that described in my parent applications, Serial No. 51,099 filed September 20, 1948 and Serial No. 14,283 filed February 7, 1950, now Patent 2,637,688 issued May 5, 1953 of which the parent applications referred to above are a continuation-in-part.

By way of review of the method herein preferred for forming the activated gas, pure oxygen gas, at a raised temperature and pressure, is first exposed to ultra violet light and then to a high voltage discharge to effect extreme activation which appears to be a polymerization of the gas. The pure polymeric oxygen gas when used for treatment of serums, vaccines and the like may then be contacted with an aqueous solution of the halogens chlorine and iodine either in elemental form or water soluble salts thereof. More specifically, pure oxygen gas is first preheated to a temperature of about 100° to 600° F., preferably 100° to 200° F. and at a raised pressure of 10 to 1,000 pounds, preferably 10 to 50 pounds. The gas in these temperature and pressure conditions is then passed over the surface of several lamps radiating ultra violet light in the wave length of 1750 to 4800 angstrom units, preferably 2300 to 2900 angstrom units and then, while under these same conditions of temperature and pressure is subjected to a high voltage discharge in the range of 5,000 to 50,000 volts, preferably 11,000 to 18,000 volts, supplied by a standard 110 volt 60 cycle alternating current to a transformer.

In this form the gas comprises pure oxygen gas containing 5 to 50,000 p.p.m. of higher polymers of oxygen. It is a sufficiently powerful oxidizing agent to be directly useful as such for treating blood and serums, or for direct body injection, but it is found for the purpose of destroying certain bacteria for preparation of vaccines, serums and the like, that a subsequent treatment of the gas is sometimes usefully applied consisting of bubbling the polymeric oxygen gas in contact with a halogen solution consisting of iodine and chlorine and inorganic compounds thereof in water to further activate the same. Where elemental halogens chlorine and iodine, or a dilute salt thereof is present in the water it is possible that trace quantities of these halogens are entrained in the gas passed therethrough but the entrained halogen is probably further oxidized by the active oxygen to a halogen oxide form. A similar action appears to take place where the halogen is present in the aqueous contact solution as a soluble salt. Thus it is probable in salt form that the halogen thereof is oxidized to a free halogen oxide by the highly active oxygen gas passed therethrough. Thus, though an unanalyzed trace quantity of halogen may be present in the gas due to oxidation of the free chlorine or iodine or salts thereof to a free or combined form, no free halogen as such is empirically found in the gas when the halogen is obtained from dilute solution containing about 1% of halogen or salt thereof.

I am not aware at this time as the exact nature of the reactions that take place in the several stages of the oxygen treatment but it appears that the oxygen gas, after subjecting to ultra violet light and high voltage discharge at raised temperatures and pressures, contains heretofore very active molecules and unrecognized higher polymers of oxygen. The present disclosure, therefore, sets forth the treatment of the gas and the properties thereof as they are now understood without limitation as to the exact chemical identification of these several components other than the presence of polymeric oxygen and its use with or without a further content of halogen imported when the gas is further contacted with free or combined halogen in solution, and it will be understood that it is not intended to be limited to any theory as to the exact reactions that take place in effecting activation of the oxygen gas.

The term activated oxygen gas as used herein, accordingly, is intended to mean a pure oxygen gas which has been subjected to ultra violet light and high voltage discharge at raised temperatures and pressures so as to contain substantial quantities of higher polymers of the oxygen gas originally treated. The term halogen activated polymeric oxygen gas is intended to define the polymerized oxygen gas which has been treated with a halogen containing solution consisting of iodine, chlorine and inorganic compounds thereof in water.

As described in my parent applications, the final treatment of the gas may consist of bubbling the same through a dilute chlorine or iodine or salts thereof solution. Such halogen solution when dilute generally comprises a 1 to 5% solution, preferably 2½ to 3% of elemental halogen or water soluble salt thereof in water. Such solution imparts no significant halogen content to the gas. Where a substantial halogen content of .1 to 5% of halogen is to be imparted to the polymerized gas, the halogen solution is saturated or substantially so and may contain more free halogen or halogen salt than will dissolve to insure saturation. Specific examples of an inorganic halogen salt or element are sodium chloride, sodium iodide, free elemental iodine, free elemental chlorine, sodium hypo-iodite, potassium tri-iodide, potassium hypochlorite, sodium tri-iodide, calcium hypo-chlorite, sodium periodate, sodium hypo-chlorite, lithium periodate, chlorine di-oxide, calcium iodide, barium chloride, strontium chlorate or magnesium chloride. Mixtures of such halogen materials in many instances are desirably used.

The through-put of the gas is variable with the size of the apparatus. For example, in an apparatus wherein each of the units has the capacity of about one cubic foot, the gas will be passed therethrough at a rate of from about .25 to 15 liters of gas per minute at which rate it is also bubbled through a liter of liquid catalyst.

The certain halogens chlorine and iodine and their salts are useful in activation of oxygen for the treatment of blood and serums but they are not full equivalents where specific effects are desirable. The heavier halogen iodine appears to be more active where a contamination comprising bacteria of the spore-forming type is encountered. Thus, where such bacteria as *M. albicans* and *Cl tetani* are present or suspected to be present, it is desirable to activate the oxygen gas with halogen comprising iodine.

Where vaccines, antibodies, or antigens generically referred to herein as serums are normally heated to destroy living bacteria or in general sterilization, this gas as described herein generally suffices to sterilize such inoculant substance without heat.

For treatment of blood, vaccines or serums, etc. according to the present method the gas is bubbled through a small quantity of inoculant fluid contained in an aseptic container at rate of about ½ to 2 liters per minute, preferably about 1-liter per minute, and the blood is generally treated in relatively small batch quantities of 50 cc. to a liter per batch of blood although greater or lesser quantities of other injectible fluids may be treated by variation of the rate of gas flow as will appear to one skilled in the art. During the treatment the gas is bubbled therethrough while maintaining the fluid out of substantial contact with contaminated air or other possible contaminating sources. The treatment of certain types of blood and serums, particularly whole blood by bubbling the activated gas therethrough, tends to cause the blood to foam. For this purpose the gas is bubbled therethrough while maintaining a slight gas suction over the top of the body fluid sufficient to withdraw the gas as it bubbles therethrough.

A further description of the method of aerating is made with reference to the drawing herewith of which the single FIGURE illustrates the method of aerating inoculant fluid and transferring the same between containers.

The system as shown comprises a storage bottle 10, a gas aerating bottle 11, and a transfer and aspirating bottle 12. Each of the bottles are fitted with resilient stoppers 13, generally of soft rubber and a self-sealing upper rubber sheath or cap 14, to maintain the same continuously in aseptically sealed state or as shown mounted on aerating bottle 11, the sheath 14' may be integrally molded with the stopper 13'. The transfer system includes the use of a plurality of hollow metallic needles 15 shown as long needles which open through an eye 16 near the bottom of the bottles and a series of short hollow needles 17 which have an eye opening 18 near the top of the bottle. Each of these needles are forced through the stopper and sheath 13 and 14 to maintain the bottle in sealed condition with the needle perforating the same, the seal being closed by the resiliency of the stoppers and sheath after the needle is withdrawn in a manner known in the art. The outer ends of the needles are interconnected by tubing such as ordinary rubber tubing 19, 19' to complete the gas tight system or in some instances as shown between bottles 11 and 12 the needle may be integral as continuous tubes shown at 19''.

In the bottle 10, a vent 20, which amounts merely to a thimble, is mounted in the stopper 13 similarly by way of a needle 21 having an eye 22, the vent of the thimble being filled with porous cotton 25 to prevent bacterial contamination by the air entering through the vent 20 during transfer of the blood or other fluid to be treated. The aerating bottle 11 has mounted, centrally perforated through the stopper 13' an activated gas aerating tube 24, the open tubular outer end of which 25 has fitted thereabout a resilient tube 19 leading from a source of activated polymeric oxygen gas (not shown). The inner end of the gas conducting tube 24 is fitted to a porous member 26 which may be porous stone or porous metal for distributing the gas evenly to the body of blood or other fluid to be treated contained therein. The tube 19 leading away from the bottle 12 is fitted with any typical suction pump (not shown) such as an aspirating bulb for applying suction to the bottle 12. In the construction shown for bottle 11 two needles 15 and 17 both connect to the single outlet 19'' through a three-way valve 27 allowing alternate suction applied either above or below the fluid line.

In operation, the three hermetically sealed bottles are set up by perforation of stoppers thereof with the needles as shown in the drawing, the bottle 10 typically comprising a container of for example, ordinary venus blood which is to be treated. The aspirator pump 27 is operated to apply suction to the bottle 12 which in turn reduced the pressure in bottle 11 connected therethrough by way of tube 19'' which in turn transfers the suction to bottle 10 by way of tube 19. The applied suction transfers the blood from container 10 through tube 19 by way of needle 17 and eye 18 to bottle 11. After a certain amount of fluid has been transferred to bottle 11 activated gas is passed through the tube 19' and bubbled up to the top of the fluid therein by way of the porous distributing head 26 for even aeration thereof. The gas bubbling therethrough is withdrawn by the continuous suction applied by the aspirator pump through bottle 12 and thence through the needle 17 above bottle 11. The rate of gas withdrawal and application of aerating gas thereto being so balanced as to allow aeration of the fluid in bottle 11 batchwise without further transfer of fluid thereto. After the blood has been aerated for a period of about 10 seconds to several minutes and has acquired the typical bright red tinge resulting from the aeration thereof or has been aerated for a lesser period depending on the type of fluid treated, the gas flow of activated gas to bottle 11 is stopped, the valve 27 between needles 15 and 17 is then reversed and continued suction now through long needles 15 in bottle 11 transfers the fluid to bottle 12. The needle in bottle 12 is then removed and the treated fluid therein is preserved self-sealed. Another empty bottle 12 is substituted for treatment of other batches.

It will be understood that the vent 20 as shown as communicating with the atmosphere may be connected to a supply of inert gas if this is desired, but according to the apparatus shown this is unnecessary since only trace quantities of air may enter the system, but the vent 20 is further protected by closing a valve 28 therein after fluid has been removed. Any source of bacterial contamination in the air is filtered through porous body 23, and will not contaminate the supply of fluid prior to treatment. Alternatively a blood product partially filling a flask may have the air displaced by this activated oxygen gas, and even pressurized slightly, and then agitated for several minutes before use.

In a typical activated oxygen gas generator, polymeric oxygen gas may be generated at any suitable rate of ½ to 10 liters per minute by processing at this rate according to the several steps and procedure outlined above. For purposes of aerating the blood or other fluid described herein the gas is passed through the blood as produced but preferably at a slower rate, from ½ to 2 liters per minute. The actual aeration of blood is effected in about 10 seconds to a few minutes of bubbling of the gas therethrough. Aeration of other fluids such as vaccines, fluids, etc. may be for lesser periods, depending on the type of bacteria. Thus, it is suitable to bubble the gas through for a period of 0.1 to 10 mins., preferably from 0.2 to 3 mins. While as described herein the gas is contacted with the fluid by bubbling the gas through the liquid blood, it is possible to spray the fluid in contact with the gas, and such procedure would particularly be applied where the fluid has been dried, such as a dried blood plasma. The following examples will illustrate the practices of this invention:

*Example I.*—A 500 cc. sample of whole blood immediately obtained as venus blood and prior to coagulation is treated in a gas treating chamber as described above by passing activated oxygen therethrough at a rate of approximately 1½ liters per minute for a period of 8 minutes. The activated oxygen gas used was obtained by preheating pure oxygen gas to a temperature of 100° F. and passing the same under pressure of 10 pounds gauge over a bank of ultra violet light lamps emitting light at a wave length of 2485 angstrom units and then subjecting the gas to a voltage discharge of 15,000 volts under the same pressure and temperature conditions. The gas was treated in this manner at an overall and continuous rate of 1½ liters per minute and was used in the treatment of whole citrated blood. Thereafter the aerated blood is suitable for immediate blood transfusion purpose. The blood during this treatment appears to have changed to a bright red suggesting arterial blood and may be directly applied through a vein of a patent, for immediate use. The blood thus created may be stored for extended periods of time without development of pyrogens.

*Example II.*—A 500 cc. sample of blood serum from which the red blood corpuscles have been filtered but containing the coagulating factor is treated by aeration as in Example I. There appears to be a slight brightening of the yellowish color and the product can be stored indefinitely. The product appears to be more stable and can be stored for longer periods of time than ordinary serums.

*Example III.*—A 500 cc. sample of blood plasma treated by aeration for four minutes at a rate of 1½ liters per minute as described in Example I. The blood plasma appears to be storable without any evidence of deterioration over a three month period. According to this example blood stored for a period of three months was found to be sterile and active and when in use in transfusion was accepted and appeared to be the full equivalent of very fresh blood plasma.

*Example IV.*—The blood treated as in Example I was given intravenously in a 500 cc. quantity to a patient who was having vomiting which had not ceased after having previous injections of (at intervals totaling 12 hours) two liters of blood intravenously injected. There was immediate improvement after the transfusion and vomiting ceased.

*Example V.*—The germicidal effect of polymeric oxygen gas upon a number of different bacteriae is shown in Table 1.

*Table 1*

| Organism | Treated | Control |
|---|---|---|
| Pseudomonas aeruginosa | No growth | Growth in 24-48 hours. |
| Micrococcus pyogenes aur | do | Do. |
| Micrococcus pyogenes alb | do | Do. |
| Neisseria meningitidis | do | Do. |
| Neisseria gonorrhoeae | do | Do. |
| Neisseria catarrhalis | do | Do. |
| Diplococcus pneumoniae | do | Do. |
| Streptococcus pyogenes | do | Do. |
| Streptococcus agalactiae | do | Do. |
| Streptococcus faecalis | do | Do. |
| Lactobacillus acidophilus | do | Do. |
| Corynebacterium diptheriae | do | Do. |
| Escherichia coli | do | Do. |
| Aerobacter aerogenes | do | Do. |
| Klebsiella pneumoniae | do | Do. |
| Protaea morganii | do | Do. |
| Salmonella paratyphi A | do | Do. |
| Salmonella hirshfeldii | do | Do. |
| Salmonella typhosa | do | Do. |
| Shigella dysenteriae | do | Do. |
| Pasteurella tularensis | do | Do. |
| Brucella abortus | do | Do. |
| Hemophilus influenzae | do | Do. |
| Hemophilus pertussis | do | Do. |
| Bacillus subtilis | do | Do. |
| Clostridium tetani | Growth, 36 hrs | Do. |
| Mycobacterium tuberculosis: | | |
|   hominis | No growth | Growth in 3 weels. |
|   bovis | do | Do. |

The tests were made by mixing heavy suspensions of the organisms in physiologic saline solution (0.9% NaCl) and bubbling polymeric oxygen gas through the treated group for exactly three minutes. Pure oxygen or air failed to inhibit growth in every instance when passed through equivalent suspensions for long periods of time. The pH of the solution was 5.2 before treatment and 4.9 after three minutes exposure to the gas. The change in the pH value alone did not prevent the bacteriae from growing. This was proven by suspending bacteriae in physiologic saline (0.9% NaCl) with the pH altered to 4.5 by the addition of amino acid to the solution. The organisms were recultured after being exposed to the lowered pH for as long as 15 minutes and growth was obtained in every instance.

Pure polymeric oxygen gas containing only pure oxygen and polymers thereof may be used for aerating the blood or serum outside the body, but may even be injected into the blood within the body by parenteral, including intravenous, injection in small quantities for example, up to about 1000 cc. of the gas, injected slowly by a method analogous to the drip procedure, at a rate of about 1 to 5 cc. per minute over a period of 1 to 3 hours.

*Example VI.*—To illustrate, direct injection of the gas, J. M., white male, six months of age, had the clinical findings of virus pneumonitis substantiated by roentgenograms of the chest, T 103.6F.(R) before therapy was instituted. No treatment was given except polymeric oxygen gas. Using a standard 20 cc. syringe, 15 cc. of the gas were slowly injected intravenously. Three minutes were required to administer the gas following which increased coughing at intervals for about 30 minutes was noted. A second injection of 15 cc. was given twelve hours later without adverse reaction. The temperature returned to normal within eighteen hours and remained normal. A roentgenogram of the chest taken 48 hours after the first film showed clearing of the pneumonitis and at 72 hours resolution was almost complete.

This case is representative of 20 similar cases treated in the same manner.

*Example VII.*—An ordinary blood container, a standard size vacuum bottle, partly filled with whole blood, and under vacuum, has 100 cc. of pure oxygen containing pure higher polymers of oxygen, and the blood and oxygen are agitated by shaking the bottle slowly to produce thorough mixing until such time as complete saturation was obtained as evidenced by the color of the blood changing from blue venus blood to the bright red appearance of arterial blood, and that aerated blood was then used for transfusion in quantity of 12 cc. per pound of body weight, of patients suffering with virus pneumonia.

*Example VIII.*—Adult patients having the same disease in a severe form, were given blood transfusions as described in Example VII, and thereafter additional quantities of pure oxygen containing pure higher polymers of oxygen, as described in Example VI, were slowly injected intravenously at a rate of approximately 3 cc. per minute for a total of 50 cc. injected over a period of approximately an hour. The patients were given a second injection at the end of 8 hours. X-rays taken at the end of 72 hours showed that the pneumonitis had substantially cleared and temperatures were normal.

*Example IX.*—Patients suffering from undulant fever were first injected intravenously with 20 cc. of a 10% aqueous solution of pure sodium iodide and immediately following that injection, the patient was injected, at the same site intravenously, with 500 cc. of the polymeric pure oxygen gas containing 25 p.p.m. of pure higher polymers of oxygen and the like, at a rate of 5 cc. per minute over a period of approximately 3 hours.

In the examples above, patients transfused with the aerated blood or with both aerated blood and with the same aeration gas, or with the gas alone, showed immediate favorable reaction and definite improvement.

By the present method spinal fluid may also be treated by aerating portions of removed spinal fluid with the present gas and then reinjecting the fluid spinally, or portions of spinal fluid may be withdrawn and substituted in the spinal canal with the pure oxygen gas containing pure higher polymers of oxygen, but no halogen.

I claim:

1. A living body injectible fluid comprising blood and serums which has been aerated for a short period of time with pure oxygen gas containing from 5 to 50,000 p.p.m. of pure higher polymeric forms of oxygen formed by irradiating pure oxygen gas with ultra violet light in a wave length of 1750 to 4800 A.U. and then subjecting the gas to a high voltage discharge in the range of 5,000 to 50,000 volts while maintaining the gas at a temperature in the range of 100° to 600° F. at a pressure of 10 to 1,000 pounds.

2. A living body injectible fluid comprising blood and serums, which has been aerated prior to injection into a human body, for a short period of time with pure oxygen gas containing 5 to 50 p.p.m. of pure higher polymeric forms of oxygen, formed by irradiating pure oxygen gas with ultra violet light in a wave length of 1750 to 4800 A.U. and then subjecting the gas to a high voltage discharge in the range of 5,000 to 50,000 volts while maintaining the gas at a temperature in the range of 100° to 600° F. at a pressure of 10 to 1,000 pounds.

3. A living body injectible fluid comprising blood and serums, having its living bacteria content destroyed by aeration thereof, prior to injection in the human body, by bubbling the gas through said injection fluid for a short period of time, merely sufficient to destroy bacteria therein, ranging from a fractional portion of a minute to several minutes with pure oxygen gas containing 5 to 50,000 p.p.m. of oxygen in a polymeric form formed by first subjecting pure oxygen gas to ultra violet light radiated in a wave length of 1750 to 4800 A.U., and then subjecting the gas to a high voltage discharge in the range of 5,000 to 50,000 volts while maintaining the gas at a pressure exceeding ten pounds.

4. Human blood, useful in human body transfusions, which has been aerated for a short period of time with pure oxygen gas containing 5 to 50,000 p.p.m. of pure higher polymers of oxygen gas formed by irradiating pure oxygen gas with ultra violet light in a wave length of 1750 to 4800 A.U. and then subjecting the gas to a high voltage discharge in the range of 5,000 to 50,000 volts while maintaining the gas at a temperature in the range of 100° to 600° F. at a pressure of 10 to 1,000 pounds.

5. The method of treating human blood comprising passing a gas into the blood consisting of pure oxygen gas and pure higher polymers of oxygen formed by irradiating pure oxygen gas with ultra violet light in a wave length of 1750 to 4800 A.U. and then subjecting the gas to a high voltage discharge in the range of 5,000 to 50,000 volts while maintaining the gas at a temperature in the range of 100° to 600° F. at a pressure of 10 to 1,000 pounds.

6. The method of medicating a living body with pure oxygen gas containing higher polymers of oxygen through the blood formed by irradiating pure oxygen gas with ultra violet light in a wave length of 1750 to 4800 A.U. and then subjecting the gas to a high voltage discharge in the range of 5,000 to 50,000 volts while maintaining the gas at a temperature in the range of 100° to 600° F. at a pressure of 10 to 1,000 pounds, and then injecting the blood intravenously into the human body.

7. The method of medicating a living body comprising parenterally injecting into the human body a gas consisting of pure oxygen gas containing from 5 to 30 p.p.m. of pure higher polymers of oxygen formed by irradiating pure oxygen gas with ultra violet light in a wave length of 1750 to 4800 A.U. and then subjecting the gas to a high voltage discharge in the range of 5,000 to 50,000 volts while maintaining the gas at a temperature in the range of 100° to 600° F. at a pressure of 10 to 1,000 pounds.

8. The method of treating blood in the human body comprising first intravenously injecting a dilute aqueous solution of a water soluble alkali metal salt selected from the group consisting of iodides and chlorides, and then injecting into the bloodstream intravenously, pure oxygen gas containing from 5 to 30 p.p.m. of pure higher polymers of oxygen formed by irradiating pure oxygen gas with ultra violet light in a wave length of 1750 to 4800 A.U. and then subjecting the gas to a high voltage discharge in the range of 5,000 to 50,000 volts while maintaining the gas at a temperature in the range of 100° to 600° F. at a pressure of 10 to 1,000 pounds.

9. A method of medicating the human body comprising aerating a body injectible carrier with pure oxygen gas containing pure polymers of oxygen formed by irradiating pure oxygen gas with ultra violet light in a wave length of 1750 to 4800 A.U. and then subjecting the gas to a high voltage discharge in the range of 5,000 to 50,000 volts while maintaining the gas at a temperature in the range of 100° to 600° F. at a pressure of 10 to 1,000 pounds and then injecting the aerated carrier into the body parenterally.

10. A method of medicating the human body comprising withdrawing spinal fluid and replacing the fluid withdrawn with pure oxygen gas containing from 5 to 30 p.p.m. of higher polymers of oxygen formed by irradiating pure oxygen gas with ultra violet light in a wave length of 1750 to 4800 A.U. and then subjecting the gas to a high voltage discharge in the range of 5,000 to 50,000 volts while maintaining the gas at a temperature in the range of 100° to 600° F. at a pressure of 10 to 1,000 pounds.

(References on following page)

References Cited in the file of this patent

UNITED STATES PATENTS

| | | |
|---|---|---|
| 829,875 | Lovejoy | Aug. 28, 1906 |
| 904,073 | Lovejoy | Nov. 17, 1908 |
| 1,724,562 | Clarke | Aug. 13, 1929 |
| 2,406,207 | Desmet | Aug. 20, 1946 |

OTHER REFERENCES

Amer. J. Physical Therapy, November 1932, pp. 212–214.

J.A.M.A., 102:8, February 24, 1934, pp. 605–606.

Vosmaer: Ozone, D. Van Nostrand C., N.Y., 1916, pp. 2, 3, 4, 6, 10, 11, 16, 17–25, 171–173.